United States Patent
Bloch

[15] 3,678,120
[45] July 18, 1972

[54] HYDROCARBON CONVERSION CATALYST AND PROCESS

[72] Inventor: Herman S. Bloch, Skokie, Ill.

[73] Assignee: Universal Oil Products Company, Des Plaines, Ill.

[22] Filed: Jan. 29, 1970

[21] Appl. No.: 6,954

[52] U.S. Cl. ...................260/668 A, 252/436, 252/439, 252/441, 260/671 C, 260/683.15 B, 260/683.47, 260/683.65

[51] Int. Cl. .................................................C07c 15/02

[58] Field of Search..............252/436, 439, 441; 260/668 A, 260/671, 671 C, 683.15 A, 683.15 B, 683.47, 683.68

[56] References Cited

UNITED STATES PATENTS

| | | | |
|---|---|---|---|
| 3,377,394 | 4/1968 | Boudakian et al. | 252/436 |
| 3,413,362 | 11/1968 | Otaku | 252/436 |
| 3,200,161 | 8/1965 | Suld et al. | 260/668 A |
| 3,201,494 | 8/1965 | Oelderik et al. | 260/671 |
| 3,336,410 | 8/1967 | Bloch et al. | 260/671 |
| 3,385,797 | 5/1968 | Bloch et al. | 252/436 |

FOREIGN PATENTS OR APPLICATIONS

| | | | |
|---|---|---|---|
| 740,489 | 8/1966 | Canada | 252/436 |

OTHER PUBLICATIONS

Olah, Friedel–Crafts and Related Reactions, Interscience Publishers, New York, 1965; Vol. I pp. 880 & 881

*Primary Examiner*—Curtis R. Davis
*Attorney*—James R. Hoatson, Jr. and Robert W. Erickson

[57] ABSTRACT

A hydrocarbon conversion catalyst comprising an inert support combined with an active catalytic complex comprising either $SbF_5$—HF or $SbF_5$—$HSO_3F$. The catalyst is particularly suitable for isomerization, alkylation and polymerization processes.

14 Claims, No Drawings

3,678,120

HYDROCARBON CONVERSION CATALYST AND PROCESS

BACKGROUND OF THE INVENTION

This invention pertains to a novel catalytic composite which exhibits exceptional catalytic activity in a selective manner. In particular, this invention relates to a novel hydrocarbon conversion catalyst particularly suitable for hydrocarbon isomerization, alkylation and polymerization processes.

In any given hydrocarbon conversion process, the performance of a given catalyst is usually measured by its activity and selectivity. As referred to herein, activity refers to the ability of a given catalyst to catalyze or promote the particular reaction desired in the process at a specified set of reaction conditions; a more active catalyst requiring lower temperatures and lower reaction times (higher space velocities, hr. $^{-1}$) than those required by a less active catalyst to achieve the same conversion of the reactants. Selectivity refers to the percentage of the reactants which have reacted and have been converted to the desired product (s). A high selectivity is indicative of more complete utilization of the reactants and an absence of undesired side reactions. Thus the art continually strives to develop more active and selective catalysts because of the direct correlation between these parameters and the operating costs of the particular commercial process in which the catalyst is employed.

A further significant property of a catalyst in the determination of its suitability in a given process is its physical form. In general, catalytic reactions are more easily effected when the catalyst exists in particulate form (e.g., spheres or granules of 1/32inch-½ inch diameter) and is contained in a fixed-bed. The reaction may then be conducted by simply passing the reactants over the catalyst. This is contrasted to moving bed operations wherein the catalyst is constantly circulating either co-currently or countercurrently to the reactants, or in fluidized operations where a micro-sized catalyst is suspended in a fluid reacting medium. These operations entail greater costs because of the additional solids handling required. Another method of effecting hydrocarbon conversion reactions, and, in particular isoparaffin alkylation, is to disperse the reactants in a liquid catalyst such as hydrogen fluoride or sulfuric acid. This mode of operation also requires additional steps of catalyst recovery plus the continuous handling of noxious liquid materials. Accordingly, it is a continued goal in the art to develop active selective catalysts suitable for utilization in hydrocarbon conversion processes in a fixed-bed manner. In the particular case of hydrocarbon alkylation such as the production of high octane motor fuels by isobutane alkylation, fixed-bed operations and catalysts suitable for use therein are continually being sought.

SUMMARY OF THE INVENTION

Accordingly, it is an object of this invention to provide a novel catalyst with activity and selectivity properties superior to catalysts currently known to the art. It is a specific object of this invention to provide a solid, active, selective alkylation catalyst and to utilize such a catalyst in a fixed bed alkylation process. It is also an object of this invention to provide an active, selective hydrocarbon isomerization catalyst and an active selective hydrocarbon polymerization catalyst.

A novel catalytic composite has now been discovered which catalyzes hydrocarbon conversion reactions at reaction temperatures and/or reaction times greatly below those presently utilized in the art. Further, this highly active catalyst catalyzes such reactions in a selective manner and at such lower temperatures than those typically utilized in the art, that secondary, side reactions are minimized if not eliminated. This catalyst can exist in solid form and can be effectively utilized as a fixed-bed in a hydrocarbon alkylation process.

In an embodiment, the present invention relates to a catalytic composite comprising a porous, inert, solid support having combined therewith an active catalytic complex comprising an antimony pentafluoride component and a hydrogen fluoride or fluosulfonic acid component.

In a limited embodiment, this active catalytic complex is combined with said support in an amount of about 5 wt. percent to about 50 wt. percent of said support and comprises a mole ratio of antimony pentafluoride to fluosulfonic acid of about 0.1:1 to about 1:1. Likewise, a complex of hydrogen fluoride-antimony pentafluoride in a mole ratio of $SbF_5$ to HF of about 0.1:1 to about 1:1 is applicable.

In a broad process embodiment, the present invention relates to a hydrocarbon conversion process which comprises contacting a hydrocarbon, at hydrocarbon conversion conditions, with a catalytic composite as described in the foregoing embodiments. In further, more limited processing embodiments, the hydrocarbon conversion process can be an isomerization process such as the isomerization of either a $C_4$—$C_8$ paraffin or an isomerizable aromatic hydrocarbon; the process can be a hydrocarbon alkylation process such as the alkylation reaction between an olefin and either an isoparaffin or an alkylatable aromatic or the process can be an olefin polymerization process.

Other objects and embodiments referring to specific descriptions of the catalyst and its utilization in various hydrocarbon conversion processes will be found in the following more detailed description of the present invention.

DESCRIPTION OF PREFERRED EMBODIMENTS

As previously indicated, the catalytic composite of the present invention, comprises a porous inert solid support, having combined therewith an active catalytic complex comprising, an antimony pentafluoride component and a hydrogen fluoride or a fluosulfonic acid component. As referred to herein, a porous inert solid support refers to solid support materials which have a surface area of about 50 square meters per gram to about 1000 square meters per gram or more, and which, when combined with the active catalytic complex will not substantially lower the catalytic activity of the combined complex, nor will the complex destroy the structural integrity and surface area of the solid support. Thus, the term inert, as used herein, does not necessarily means that the support is non-reactive to the reactants which are utilized in a process in which the subject catalyst is utilized nor does it mean there is no reaction between the catalytic complex and the support, provided, as previously stated, such reaction does not substantially lower the activity of the complex nor destroy the surface area of the support. Therefore, siliceous materials such as silica are not suited for utilization in the composite of the present invention. Supports particularly suitable and preferred for utilization in catalysts of this invention are activated charcoal, activated carbon, graphite and the like.

The active catalytic complex with which the foregoing porous, inert solid supports are to be combined comprises an antimony pentafluoride component and a hydrogen fluoride or fluosulfonic acid component. Thus, the catalytic composite of the present invention includes active catalytic complexes of antimony pentafluoride and fluosulfonic acid; antimony pentafluoride and hydrogen fluoride; and antimony pentafluoride, hydrogen fluoride and fluosulfonic acid. Particularly preferred are antimony pentafluoride and fluosulfonic acid complexes.

Antimony pentafluoride ($SbF_5$), hydrogen fluoride (HF) and fluosulfonic acid ($HSO_3F$, also known as fluorosulfonic acid or fluorosulfuric acid) are each compounds well known to the art but whose combination in the aforesaid manner with a porous, inert solid as an effective catalytic composite has been heretofore unrecognized. Since antimony pentafluoride has a normal boil-ing point (B.P.) of 149.5° C. and a melting point (M.P.) of 7° C., hydrogen fluoride has a B.P. of 19.4° C. and a M.P. of —83° C. and fluosulfonic acid has a B.P. of 165.5° C. and a M.P. of —87.3° C., the catalytic complexes formed by admixing antimony pentafluoride with either fluosulfonic acid or hydrofluoric acid are liquid solutions at ambient temperatures and pressures. While not to be limited by the following theory, it is believed antimony pentafluoride-fluosulfonic acid admixtures result in the formation of a $2H$-$SO_3F \cdot SbF_5$ complex which may be considered in its ionic form to be $H_2SO_3F^+SbF_5SO_3F^-$. Likewise, antimony pentafluoride - hydrogen fluoride admixture may be considered as $2HF \cdot SbF_5$ complex in the form of $H_2F^+SbF_6^-$. Accordingly, it is preferred that the active catalytic complex comprise a mole ratio of the antimony pentafluoride component to the hydrogen fluoride or fluosulfonic acid component of about 0.5:1 but it is within the scope of the present invention to include mole ratios of antimony pentafluoride to hydrogen fluoride or fluosulfonic acid of about 0.1:1 to about 1:1. This complex is then combined with the foregoing porous, inert solid support to provide a final composite containing a complex concentration of about 5 to about 50 wt. percent of said support. Particularly preferred is a catalytic composite containing about 10 wt. percent to about 25 wt. percent complex wherein the complex contains a mole ratio of antimony pentafluoride to fluosulfonic acid of about 0.1:1 to about 1:1. Also preferred is a composite containing about 10 wt. percent to about 25 wt. percent of a complex containing a mole ratio of antimony pentafluoride to hydrogen fluoride of about 0.2:1 to about 0.5:1. Because of its lower volatility and relatively higher acidity, fluosulfonic acid containing complexes are preferred. However, any reference herein to the term antimony pentafluoride-acid complex includes as the acid hydrogen fluoride as well as fluosulfonic acid. Whatever acid is used, it is essential that the composite be kept and utilized at essentially anhydrous conditions to avoid any decomposition or deactivation of the catalytic complex.

This catalytic complex may be combined with a porous, inert solid support, such as activated charcoal, by methods known to the art such as pilling, impregnation, etc. in any form such as spheres, pills, extrudates, etc. Thus the liquid complex may be admixed with activated charcoal in fine particulate form and compressed to form a solid porous catalyst containing the desired amount of complex. Since the complex is liquid, another method of manufacture comprises immersing the charcoal in the liquid complex with the sorption thereon of the desired amount of complex. It appears that the complex, although normally liquid, is tenaciously held, because of the physical properties of the mixture, to the carbon by Van der Waals or activated adsorption which permits the resulting catalytic complex to remain relatively firmly combined with the solid inert, porous support even when the catalytic composite is utilized in a hydrocarbon conversion process.

The resulting composite is effective for catalyzing a myriad of hydrocarbon conversion processes such as isomerization, cracking, polymerization, alkylation, disproportionation, transalkylation, dealkylation and the like. Such processes are effected by contacting a reactive hydrocarbon with the aforedescribed catalysts at hydrocarbon conversion conditions in a hydrocarbon conversion zone. This contacting may be accomplished by using the catalyst in a fixed bed system, a moving bed system, a fluidized bed system or in a batch type operation; however, in view of the danger of attrition losses of the catalyst and the aforedescribed, well known operational advantages, it is preferred to use a fixed bed system. In this system, a hydrocarbon charge stock is brought, by any suitable heat exchange means, to the desired hydrocarbon conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion. In addition, it is to be noted that the reactants may be in a liquid phase, a mixed liquid-vapor phase or a vapor phase when they contact the catalyst, with best results obtained in the liquid phase.

The catalyst of this invention is applicable to the isomerization of isomerizable hydrocarbons including paraffins and naphthenes. It is particularly suitable for the isomerization of straight chain or mildly branched chain paraffins containing four or more carbon atoms per molecule such as normal butane, normal pentane, normal hexane, normal heptane, normal octane, etc., and mixtures thereof. Cycloparaffins applicable are those ordinarily containing at least five carbon atoms in the ring such as alkylcyclopentanes and cyclohexanes, including methylcyclopentane, dimethylcyclopentane, cyclohexane, dimethylcyclohexane, etc. This process also applies to the isomerization of mixtures of paraffins and/or naphthenes such as those derived by selective fractionation and distillation of straight run natural gasolines and naphthas. Such mixtures of paraffins and/or naphthenes include the so-called pentane fractions, hexane fractions and mixtures thereof. It is not intended, however, to limit this invention to the isomerization of the enumerated saturated hydrocarbons, and it is contemplated that straight or branched chain saturated hydrocarbons containing up to about 25 carbon atoms per molecule may be isomerized, including those paraffins contained in jet fuels, lubes, etc., according to the process of the present invention, with $C_4$—$C_8$ paraffinic hydrocarbons being particularly preferred.

Olefins may also be isomerized by the catalyst of the present invention such as a mixture of olefinic hydrocarbons of approximately the same molecular weight, including the 1-isomer, 2-isomer and other position isomers capable of undergoing isomerization to an olefin in which the double bond occupies a more centrally located position in the hydrocarbon chain. The catalyst of this invention can thus be used to provide an olefinic feedstock for motor fuel alkylation purpose containing an optimum amount of the more centrally located double bond isomers by converting the 1-isomer or other near terminal position isomers into olefins wherein the double bond is more centrally located in the carbon atom chain. The catalyst of this invention is thus applicable to the isomerization of olefinic hydrocarbons such as the isomerization of 1-butene to 2-butene or the isomerization of the 3-methyl-1-butene to 2-methyl-2-butene. Also, the catalyst of this invention can be utilized to shift the double bond of an olefinic hydrocarbon such as 1-pentene, 1-hexene, 2-hexene, and 4-methyl-1-pentene to a more centrally located position so that 2-pentene, 2-hexene, 3-hexene and 4-methyl-2-pentene, respectively, can be obtained. It is not intended, however, to limit this invention to these enumerated olefinic hydrocarbons as it is contemplated that shifting of the double bond to a more centrally located position may be effective in straight or branched chain olefinic hydrocarbons containing up to about 20 carbon atoms per molecule. It is also not intended to limit the scope of this invention to isomerization processes wherein only the olefinic bond is isomerized to a new position but also where the skeletal arrange-ment of the hydrocarbon is also changed such as the isomerization of 1-pentene to 3-methyl-1-butene and/or 2-methyl-2-butene. Particularly preferred are the $C_4$—$C_7$ isomerizable olefins. Considerable polymerization may accompany olefin isomerization with these catalysts, however, unless extremely short contact times are used.

Further, the catalyst of this invention is also applicable to the isomerization of isomerizable alkylaromatic hydrocarbons including ortho-xylene, meta-xylene, para-xylene, ethylbenzene, the ethyltoluenes, the trimethylbenzenes, the diethylbenzenes, the triethylbenzenes, normal propylbenzene, isopropylbenzene, etc., and mixtures thereof. Preferred isomerizable alkylaromatic hydrocarbons are the monocyclic alkylaromatic hydrocarbons, that is, the alkylbenzene hydrocarbons, particularly the $C_8$ alkylbenzenes and non-equilibrium mixtures of the various $C_8$ aromatic isomers. Higher molecular weight alkylaromatic hydrocarbons such as the alkylnaphthalenes, the alkylanthracenes, the alkylphenanthrenes, etc., are also suitable.

The process of this invention, utilizing the catalyst hereinbefore set forth, for isomerizing isomerizable hydrocarbons is preferably effected in a continuous, down-flow, fixed bed system. One particular method is continuously passing the hydrocarbon to an isomerization reaction zone containing the catalyst and maintaining the zone at proper isomerization conditions such as a temperature in the range of about $-80°$ C. to about 200° C. or more, preferably −20° C. to about 100° C., and a pressure of about atmospheric to about 100 atmospheres or more. The hydrocarbon is passed over the catalyst at a liquid hourly space velocity (defined as volume of liquid hydrocarbon passed per hour per volume of catalyst, hr.$^{-1}$) of from about 0.5 to about 50 hr.$^{-1}$ or more. In addition, diluents such as argon, nitrogen, hydrogen, etc., may be present. The isomerized product is continuously withdrawn, separated from the reactor effluent and recovered by conventional means, preferably fractional distillation, while the unreacted starting material may be recycled to form a portion of the feed stock.

The catalyst of the present invention is also suitable for catalyzing hydrocarbon polymerization processes. Such a process may be effected by contacting a polymerizable hydrocarbon with said catalyst in the aforedescribed manner at a temperature of about −100° C. to about 100° C., a pressure of about atmospheric to about 200 atmospheres, and a liquid hourly space velocity of about 0.1 hr.$^{-1}$ to about 10 hr.$^{-1}$. Such processes may also be effected in the presence of diluents such as relatively inert paraffins and aromatics like pentane or hexane. Polymerizable olefins suitable for polymerization according to the process of the present invention include the $C_2$—$C_{10}$ monoolefins no matter where the double bond appears or the molecular arrangement of the carbon skeleton. Thus, 1-olefins such as ethylene, propylene, 1-butene, 1-pentene, etc., are as applicable as isobutylene, 2-butene, 2-pentene, 2-methyl-butene-1, etc. Di-and poly-olefins whether in the conjugated form or not such as 1,2-butadiene, 1-3-butadiene, isoprene, 1,4-pentadiene are also suitable as are cyclic olefins such as cyclohexene. Also alkenyl aromatic compounds such as styrene, alpha-methylstyrene and other alkyl substituted styrenes may be polymerized according to the process of the present invention. Further, formation of homo-polymers and co-polymers is also within the scope of this invention as is the production of dimers, trimers or higher molecular weight species. Particularly preferred is the polymerization of $C_2$—$C_5$ olefins into a liquid olefin product of higher molecular weight.

The catalyst of the present invention is a particularly effective solid catalyst for the alkylation of an alkylatable hydrocarbon with an olefin-acting compound. Such an alkylation process is preferably effected by contacting an alkylatable hydrocarbon with the catalyst of this invention and with an olefinacting compound, at alkylation conditions including a temperature of about −50° C. to about 75° C. To prevent polymerization of the olefin-acting compound, it is preferred that the mole ratio of alkylatable hydrocarbon to olefin-acting compound be about 1:1 to about 10:1 and that these compounds be intimately admixed with each other before contacting the catalyst.

Alkylatable hydrocarbons suitable for alkylation according to the process of the present invention include isoparaffins such as isobutane, isopentane, isohexane, etc., monocyclic aromatic hydrocarbons such as benzene, toluene, orthoxylene, meta-xylene, para-xylene, ethylbenzene, cumene, etc.; substituted aromatic hydrocarbons such as phenol, thiophenol, resorcinol, quinone, anisole, ethoxybenzene, etc.; polycyclic aromatics such as diphenyl, diphenylmethane, naphthalene, anthracene, fluorene stilbene, etc. Preferred species include the isoparaffins such as isobutane and the monocyclic aromatics such as benzene or toluene. Because paraffin isomerization occurs with these catalysts, n-paraffins may also be used as a feedstock for alkylation reactions.

Olefin acting compounds capable of alkylating the foregoing alkylatable hydrocarbons include mono-olefins, poly-olefins, alkynes, alcohols, ethers, esters, alkylhalides, alkyl sulfates, alkylphosphates, carbohydrates, etc. Preferred alkylating agents for the alkylation of a $C_4$—$C_6$ isoparaffins so as to produce high octane number motor fuel include the $C_3$—$C_6$ mono-olefins. Preferred alkylating agents for the alkylation of monocyclic aromatics, such as benzene, include the $C_2$—$C_5$ mono-olefins although it is within the scope of the present invention to alkylate such aromatics with higher molecular weight $C_8$—$C_{20}$ olefins as utilized in the production of detergent alkylate. In any event, any of the foregoing olefins may be diluted with inert gases such as hydrogen, nitrogen, methane, ethane, etc., as found in typical refinery streams.

ILLUSTRATIVE EMBODIMENTS

The following illustrations are presented to further illustrate the preparation of the catalytic composition of the present invention and its utilization in various hydrocarbon conversion processes. This material, however, is not presented for purposes of limiting the scope of this invention but is presented in order to further describe the catalyst and processes embodied in the present invention. Modifications readily made by those trained in the art are included within the scope of the present invention which is to be limited only by the appended claims.

ILLUSTRATION I

An anhydrous solution containing 33 mole percent antimony pentafluoride and 67 mole percent fluosulfonic acid is prepared. Activated carbon particles having a relatively spherical shape of about 1/16 inch diameter, a surface area of about 800 square meters per gram and pore diameters in the range of about 20 to 100 Angstrom units are immersed in this solution for about 2 hours at 20° C. The excess solution is then removed, leaving sorbed on the activated carbon about 20 weight percent of the original $SbF_5$—$HSO_3F$ solution. In a similar manner, an antimony pentafluoride-hydrogen fluoride catalytic composite is prepared from a solution containing 3 moles of HF per mole of $SbF_5$.

ILLUSTRATION II

The antimony fluoride-fluosulfonic acid catalytic composite as prepared in Illustration I is placed in a continuous-flow-fixed-bed pilot plant of conventional design. A 10:1 (mole) isobutane to n-butylene mixture is continuously passed to this reactor at a 5 hr.$^{-1}$ liquid hourly space velocity (LHSV) with the reactor being maintained at a temperature of 0° C. and a pressure of 300 psig. The resulting product contains trimethylpentanes and dimethylhexanes indicative of the alkylation reaction having taken place. In a similar manner, a 10:1 (mole) benzene to ethylene admixture is alkylated to form ethylbenzene.

ILLUSTRATION III

The catalytic composite as prepared in Illustration I and used in Illustration II is placed in a fixed-bed, continuous-flow, pilot plant of conventional design. Normal butane is continuously passed to this reactor at a 4 hr.$^{-1}$ LHSV with the reactor being maintained at a temperature of 80° C. and a pressure of 500 psig. The resulting product indicates substantial isomerization of the n-butane to isobutane. In a like manner, essentially pure meta-xylene is isomerized to form a mixture of xylene isomers at a LHSV of 2 hr.$^{-1}$ and a temperature of 100° C.

ILLUSTRATION IV

The catalytic composite of Illustration II is placed in a continuous-flow fixed bed pilot plant of conventional design. Propylene is continuously passed thereto at a LHSV of 10 hr.$^{-1}$ with the reactor being maintained at an inlet temperature of about 30° C. and a pressure of about 1000 psig. The resulting product contains considerable amounts of $C_6$, $C_9$, $C_{12}$ and $C_{15}$ olefin products indicative of the propylene polymerization having taken place.

I claim as my invention:

1. A catalytic composite suitable for fixed-bed hydrocarbon conversion processess comprising a porous, inert solid support having combined therewith an active catalytic complex comprising an antimony pentafluoride component and hydrogen fluoride or a fluosulfonic acid component.

2. The catalytic composite of claim 1 further characterized in that said support is activated charcoal.

3. The catalytic composite of claim 1 further characterized in that said catalytic complex is combined with said support in an amount of about 5 wt. percent to about 50 wt. percent of said support and comprises a mole ratio of antimony pentafluoride to fluosulfonic acid of about 0.1:1 to about 1:1.

4. The catalytic composite of claim 1 further characterized in that said catalytic complex is combined with said support in an amount of about 5 wt. percent to about 50 wt. percent of said support and comprises a mole ratio of antimony pentafluoride to hydrogen fluoride of about 0.10:1 to about 1:1.

5. A hydrocarbon conversion process which comprises contacting a hydrocarbon, at hydrocarbon conversion conditions, with a catalytic composite comprising a porous inert support having combined therewith an active catalytic complex comprising an antimony pentafluoride component and a hydrogen fluoride or a fluosulfonic acid component.

6. The process of claim 5 further characterized in that said hydrocarbon conversion process is an isomerization process, said hydrocarbon is an isomerizable hydrocarbon, and said conversion conditions include a temperature of about $-80°$ C. to about $200°$ C.

7. The process of claim 6 further characterized in that said hydrocarbon is a $C_4$–$C_8$ paraffin.

8. The process of claim 6 further characterized in that said hydrocarbon is an isomerizable monocyclic aromatic.

9. The process of claim 5 further characterized in that said hydrocarbon conversion process is an alkylation process, said hydrocarbon is an alkylatable hydrocarbon and is contacted with said catalyst, and an olefin acting compound, at alkylation conditions including a temperature of about $-50°$ C. to about $75°$ C.

10. The process of claim 9 further characterized in that said alkylatable hydrocarbon is a $C_4$–$C_6$ isoparaffin and said olefin acting compound is a $C_3$–$C_6$ mono-olefin.

11. The process of claim 9 further characterized in that said alkylatable hydrocarbon is a monocyclic aromatic and said olefin acting compound is a $C_2$–$C_5$ mono-olefin.

12. The process of claim 11 further characterized in that said aromatic is benzene or toluene.

13. The process of claim 5 further characterized in that said hydrocarbon conversion process is a polymerization process, said hydrocarbon is a polymerizable hydrocarbon, and said conversion condition includes a temperature of about $-100°$ C. to about $100°$ C.

14. The process of claim 12 further characterized in that said polymerizable hydrocarbon is a $C_2$–$C_5$ olefin.

* * * * *